(12) United States Patent
Aleksic et al.

(10) Patent No.: US 11,138,968 B2
(45) Date of Patent: Oct. 5, 2021

(54) SPEECH PROCESSING (71) Applicant: Google LLC, Mountain View, CA (US)

(72) Inventors: Petar Aleksic, Jersey City, NJ (US); Benjamin Paul Hillson Haynor, New York, NY (US)

(73) Assignee: Google LLC, Mountain View, CA (US)

( * ) Notice: Subject to any disclaimer, the term of this patent is extended or adjusted under 35 U.S.C. 154(b) by 134 days.

(21) Appl. No.: 16/696,111

(22) Filed: Nov. 26, 2019

(65) Prior Publication Data
US 2020/0175963 A1 Jun. 4, 2020

Related U.S. Application Data (60) Provisional application No. 62/773,361, filed on Nov. 30, 2018.

(51) Int. Cl.
*G10L 15/00* (2013.01)
*G06F 40/40* (2020.01)
*G10L 15/06* (2013.01)
*G06F 40/45* (2020.01)
*G10L 15/187* (2013.01)
*G10L 15/197* (2013.01)

(52) U.S. Cl.
CPC ............ *G10L 15/063* (2013.01); *G06F 40/45* (2020.01); *G10L 15/005* (2013.01); *G10L 15/187* (2013.01); *G10L 15/197* (2013.01)

(58) Field of Classification Search
CPC ................................ G10L 15/00; G06F 40/40
See application file for complete search history.

(56) References Cited

U.S. PATENT DOCUMENTS

2007/0271088 A1\* 11/2007 Waibel .................... G06F 40/44
704/9
2008/0046244 A1\* 2/2008 Ohno ...................... G10L 15/30
704/255
2009/0281789 A1\* 11/2009 Waibel .................... G06F 40/40
704/3

(Continued)

OTHER PUBLICATIONS

Aleksic et al., "Bringing contextual information to google speech recognition," Interspeech, 2015, 5 pages.

(Continued)

*Primary Examiner* — Shreyans A Patel
(74) *Attorney, Agent, or Firm* — Honigman LLP; Brett A. Krueger; Grant Griffith (57) ABSTRACT

Methods, systems, and apparatus, including computer programs encoded on a computer storage medium, for adapting a language model are disclosed. In one aspect, a method includes the actions of receiving transcriptions of utterances that were received by computing devices operating in a domain and that are in a source language. The actions further include generating translated transcriptions of the transcriptions of the utterances in a target language. The actions further include receiving a language model for the target language. The actions further include biasing the language model for the target language by increasing the likelihood of the language model selecting terms included in the translated transcriptions. The actions further include generating a transcription of an utterance in the target language using the biased language model and while operating in the domain.

20 Claims, 4 Drawing Sheets

(56) References Cited

U.S. PATENT DOCUMENTS

| | | | |
|---|---|---|---|
| 2011/0231183 A1* | 9/2011 | Yamamoto | G10L 15/19 |
| | | | 704/9 |
| 2012/0029903 A1* | 2/2012 | Precoda | G10L 15/26 |
| | | | 704/2 |
| 2012/0029904 A1 | 2/2012 | Precoda et al. | |
| 2012/0278060 A1 | 11/2012 | Cancedda et al. | |
| 2016/0140218 A1 | 5/2016 | Moreno Mengibar et al. | |
| 2017/0032781 A1* | 2/2017 | Sharifi | G06F 40/284 |
| 2018/0336895 A1 | 11/2018 | Aleksic et al. | |
| 2020/0175963 A1* | 6/2020 | Aleksic | G10L 15/063 |

OTHER PUBLICATIONS

Aleksic et al., "Improved recognition of contact names in voice commands," in ICASSP, Apr. 2015, 5172-5175.

Allauzen and Riley, "Bayesian language model interpolation for mobile speech input," Interspeech, 2011, 1429-1432.

Allauzen et al., "OpenFst: A general and efficient weighted finite-state transducer library," in CIAA, 2007, 4783: 11-23.

Ballinger et al., "On-demand language model interpolation for mobile speech input," Interspeech, 2010, 1812-1815.

Bellegarda, "Statistical language model adaptation: review and perspectives," Speech Communication, Jan. 2004, 42: 93-108.

Brown et al., "Class-based n-gram models of natural language," Computational Linguistics, Dec. 1992, 18: 467-479.

Hall et al., "Composition-based on-the-fly rescoring for salient ngram biasing," Interspeech, 2015, 5 pages.

Jyothi et al., "Distributed discriminative language models for google voice search," Proceedings of ICASSP 2012, 5017-5021.

Katz, "Estimation of probabilities from sparse data for the language model component of a speech recognizer," in IEEE Transactions on Acoustics, Speech and Signal Processing, Mar. 1987, 400-401.

Kneser and Steinbiss, "On the dynamic adaptation of stochastic language models," IEEE International Conference on Acoustics, Speech and Signal Processing, Apr. 1993, 586-589.

Kullback, "Letter to the editor: The kullbackleibler distance," The American Statistician, 1987, 41(4): 340-341.

Michaely et al., "Unsupervised Context Learning for Speech Recognition," IEEE Spoken Language Technology Workshop, Dec. 2016, 447-453.

Mohri et al., "Weighted finite-state transducers in speech recognition," Computer Speech and Language, Jan. 2002, 16: 69-88.

Sak et al., "Long short-term memory recurrent neural network architectures for large scale acoustic modeling," in Interspeech, 2014, 5 pages.

Sak et al., "Sequence discriminative distributed training of long short-term memory recurrent neural networks," Interspeech, 2014.

Vasserman et al., "Sequence-based class tagging for robust transcription in asr," in Proc. Interspeech, Sep. 2015.

"Language Model Adaption with Additional Text Generated by Machine Translation" Nakajima et al. Aug. 26, 2002.

"Language Model Adaptation Using Cross-Lingual Information" Woosung Kim and Sanjeev Khudanour et al. Sep. 1, 2003.

MDI Adaption of Language Models Across Corpora Rao et al, Sep. 22, 1997.

International Search Report & Written Opinion for PCT Application PCT/US2019/063272 dated Feb. 18, 2020.

* cited by examiner

SPEECH PROCESSING

CROSS-REFERENCE TO RELATED APPLICATION

This application claims the benefit of U.S. Application 62/773,361, filed Nov. 30, 2018, which is incorporated by reference.

TECHNICAL FIELD

This specification generally relates to systems and methods for processing speech input.

BACKGROUND

It is increasingly desired to enable interactions with computers to be performed using speech inputs. This requires developments in input processing, in particular how to program computers to process and analyze natural language data. Such processing may involve speech recognition, which is a field of computational linguistics that enables the recognition and translation of spoken language into text by computers.

SUMMARY

For optimal speech recognition accuracy, general purpose speech recognitions systems may need to be adapted to excel at domain specific speech recognition. The domain may be related to the type of device receiving the speech data, an application running on the device receiving the speech data, and/or the context of the device receiving the speech data. For example, speech recognition quality may improve for a speech recognition system in a vehicle if the speech recognition system is adapted for use in the vehicle by being able to more quickly and accurately transcribe speech that includes words or phrases that the user is likely to speak in the vehicle.

One technique used to adapt a speech recognition system to a particular domain may be to analyze the transcription logs received by the speech recognition system operating in the particular domain. The adaption process may include identifying the words or phrases that are more common in the transcription logs for the particular domain than in transcriptions logs of a general speech recognition system. A language model may be biased such that the language model is more likely to generate candidate transcriptions that include the words or phrases that are more common in the transcription logs for the particular domain.

This technique may not be practical for launching a speech recognition system for a particular domain in a new target language if there are no transcription logs for that particular domain in the target language. In this instance, it may be helpful to leverage the domain-specific transcription logs from another language. A language model adaption system may translate the domain-specific transcription logs into the target language. The language model adaption system may analyze the translated transcription logs to identify words and phrases that appear to be more common for users speaking to devices operating in the particular domain. With the common words identified, the language model adaption system may bias a general purpose language model for the target language such that the biased language model may be more likely to generate transcriptions that include the common words when processing audio data that may sound similar to other words in the target language.

With the biased language model, it may be possible to launch a speech recognition system for the particular domain in the target language and benefit from improved speech recognition with improved accuracy and latency. Users may benefit from a speech recognition that is configured, at launch of the system, to more quickly and accurately recognize words and phrases that the users are more likely to say when speaking to a system operating in the particular domain.

According to an innovative aspect of the subject matter described in this application, a method for processing speech input includes the actions of receiving, by a computing device, transcriptions of utterances that were received by computing devices operating in a domain and that are in a source language; generating, by the computing device, translated transcriptions of the transcriptions of the utterances in a target language; receiving, by the computing device, a language model for the target language; biasing, by the computing device, the language model for the target language by increasing the likelihood of the language model selecting terms included in the translated transcriptions; and generating, by the computing device while operating in the domain, a transcription of an utterance in the target language using the biased language model.

These and other implementations can each optionally include one or more of the following features. The action of generating a transcription of an utterance in the target language using the biased language model includes, while the computing device is operating in the domain, receiving, by the computing device, audio data of the utterance; providing, by the computing device, the audio data as an input to an acoustic model that is configured to identify phonemes of the utterance; based on the computing device operating in the domain, providing, by the computing device, the phonemes of the utterance as an input to the biased language model; and, based on providing the phonemes of the utterance as the input to the biased language model, generating, by the computing device, a transcription of the utterance. The language model for the target language is a general language model. The biased language for the target language is a language model specific for computing devices operating in the domain. The actions include identifying, by the computing device, n-grams that appear in the translated transcription and an appearance frequency of each n-gram; and identifying, by the computing device, a subset of the n-grams that appear in the translated transcriptions more than a threshold appearance frequency.

The computing device biases the language model by increasing the likelihood of the language model selecting the subset of n-grams. The action of increasing the likelihood of the language model selecting the subset of n-grams includes increasing, for each n-gram in the subset of n-grams, the likelihood by a larger amount based on a larger difference between the appearance frequency for the n-gram and the threshold appearance frequency. The actions include receiving, by the computing device, audio data of the utterances that were received by the computing device operating in the domain and that are in the source language. The action of receiving the transcriptions of the utterances that were received by the computing devices operating in the domain and that are in the source language includes generating, by the computing device, the transcriptions of the utterances that were received by computing devices operating in a domain and that are in a source language. The actions include receiving, by the computing device, additional transcriptions of additional utterances that were received by the computing devices operating in domains other than the domain and that are in the source language; generating, by the computing device, additional translated transcriptions of the additional transcriptions; identifying terms that have a higher appearance frequency in the translated transcriptions than in the additional translated transcriptions.

The action of biasing the language model for the target language by increasing the likelihood of the language model selecting terms included in the translated transcriptions includes biasing the language model for the target language by increasing the likelihood of the language model selecting terms that have a higher appearance frequency in the translated transcriptions than in the additional translated transcriptions. The actions include receiving, by the computing device, grammars in the target language. The action of biasing the language model for the target language by increasing the likelihood of the language model selecting terms included in the translated transcriptions includes biasing the language model for the target language by increasing the likelihood of the language model selecting grammars that include the terms included in the translated transcriptions.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. It may be possible to launch a speech recognition system for a new language and domain that is configured to more accurately and quickly recognize common phases spoken by user in that domain. It may not be necessary to collect any speech data for that domain in the new language.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
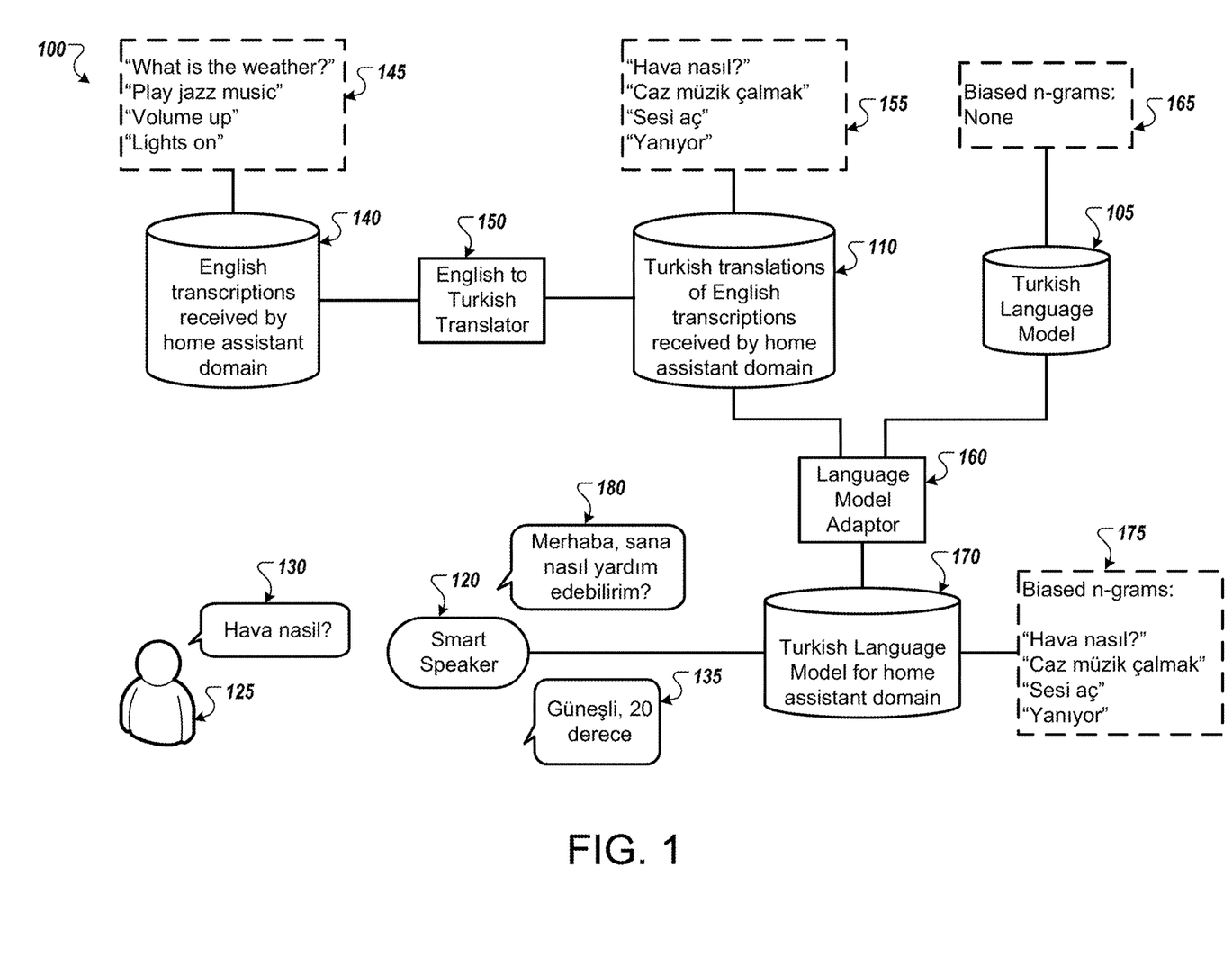
FIG. 1 illustrates an example system that biases a language model for use in a specific domain using translated training data.

FIG. 1 illustrates an example system 100 that biases a language model 105 for use in a specific domain using translated training data 110. Briefly, and as described in more detail below, the system 100 examines translated training data 110 to identify common words and phrases that are likely to be used by speakers in a specific domain. The system 100 biases a language model to favor those common words and phrases.

A smart speaker 120 may use the biased language model 115 during the automated speech recognition process. The user 125 speaks a query 130 to the smart speaker 120, and the smart speaker 120 uses the biased language model 115 to generate a transcription of the query 130. Based on the query 130, the smart speaker 120 may generate a response 135 to the query 130.

With many different languages around the world, it may not be practical to design a speech recognizer that is capable of accurately recognizing all languages. For example, the same speech recognizer may not be able to recognize both English and Turkish. Instead, a speech recognizer may use an English acoustic model that is trained to identify English phonemes and an English language model that is configured to identify English words and phrases, which may be referred to as n-grams (e.g., unigram being a single word, a bigram being a two word phrase, etc.). Another speech recognizer may use a Turkish acoustic model that is trained to identify Turkish phonemes and a Turkish language model that is configured to identify Turkish words and phrases. When a user speaks a language that the speech recognizer is not configured to recognize, the transcription generated by the speech recognizer may not be accurate. Additionally, the computational resources required by a speech recognizer accessing multiple acoustic models and multiple language models may be too high, which would result in an unacceptable latency for the speaker.

Speech recognizers may be adapted for different types of situations. For example, a speech recognizer may be adapted for use in a vehicle, by a smart speaker without a display, by a smart speaker with a display, by a digital assistant application running on a mobile phone, by a digital assistant application running on a laptop computer, or any other similar application or situation. The application or situation may be referred to as the domain. A speech recognizer that is configured to recognize a particular language may be adapted for use in different domains. For example, an English speech recognizer may be adapted for use by a digital assistant application running on a mobile phone or for use by a smart speaker with a display. A user interacting with the digital assistant application running on a mobile phone may be more likely to say a first set of n-grams, and a user interacting with a smart speaker with a display may be more likely to say a second set of n-grams that may or may not include some of the n-grams of the first set. Therefore, a developer may bias the language model of the speech recognizer for the digital assistant application running on a mobile phone domain to be more likely to recognize the first set of n-grams and bias the language model of the speech recognizer for the smart speaker with a display domain to be more likely to recognize the second set of n-grams.

Identifying the n-grams to bias the language model may be accomplished by examining transcriptions of utterances received by a computing devices operating in a particular domain. For example, to identify the popular n-grams for the smart speaker without a display domain, the system 100 may examine the transcriptions of utterances received by smart speakers without a display. The system 100 may identify the most common n-grams and bias a language model to favor those n-grams. The smart speakers without a display may then perform automated speech recognition processes using the biased language model.

This biasing process for a specific language may not be practical for a situation where transcriptions of utterances received by a computing devices operating in the particular domain are not available in the specific language. The transcriptions may not be available because the smart speaker without a display may not be available for purchase in the country where the population speaks the specific language. For example, the smart speaker without a display may not be available in Turkey. Therefore, there are likely very little if any transcriptions of people speaking Turkish to a smart speaker without a display.

Despite this lack of transcription data, the system 100 may be able to leverage data from other languages to bias a language model of the target language. For example, the system 100 may be able to leverage the English transcription data 140 to bias the Turkish language model 115. Doing so, may allow the application or product to launch with a Turkish language model that is biased, or adapted, toward the particular domain, such as a smart speaker without a display.

As illustrated in FIG. 1, the system 100 accesses English transcription data 140 that was received by computing devices operating in the home assistant domain. A device operating in the home assistant domain may include devices such as a smart speaker without a display. Other devices may operate in the home assistant domain, and transcriptions collected from those devices may be added to the English transcription data 140. As an example, the English transcription data 140 may include transcriptions 145 such as "what is the weather," "play jazz music," "volume up," "lights on," and transcriptions of other utterances received by devices operating in the home assistant domain.

In some implementations, the system 100 may generate the English transcription data 140 by performing automated speech recognition on audio data of utterances received by devices operating in the home assistant domain. In some implementations, the system 100 may receive the English transcription data 140 from manual transcribers who transcribed the audio data of utterances received by devices operating in the home assistant domain. In some implementations, the English transcription data 140 may include a mix of both automated transcriptions and manual transcriptions.

The system 100 provides the English transcription data 140 as an input to an English to Turkish translator 150. The English to Turkish translator 150 may be a machine translator that automatically translates the English transcription data 140 to Turkish transcription data 110. In some implementations, the English to Turkish translator 150 may be a manual translator.

The Turkish transcription data 110 may include transcriptions 155 such as, "hava nasil?", "caz müzik çalmak," "sesi aç," and "yaniyor," which may be Turkish translations of "what is the weather," "play jazz music," "volume up," and "lights on," respectively. The transcriptions 155 may include additional translated transcriptions of the English transcription data 140.

In some implementations, the English to Turkish translator 150 may make errors in translating the English transcription data 140. In this case, the system 100 may translate additional English transcription data transcribed from other utterances received in a variety of domains and/or in a general domain. The system 100 may provide the general English transcription data as an input to the English to Turkish translator 150. The system 100 may compare the Turkish transcription data 110 to the general Turkish transcription data to identify n-grams that may be more common in the home assistant domain. Using both domain specific translated transcriptions and general translated transcriptions may allow the system 100 to remove some of the errors that occur during translation. Because some errors may be likely to occur when translating domain specific transcriptions as when translating general transcriptions, those errors may cancel out and the system may not identify n-grams related to the errors as more likely to occur in a specific domain.

The system 100 provides the Turkish transcription data 110 and a Turkish language model 105 as an input to the language model adaptor 160. The language model adaptor 160 may be configured to bias the Turkish language model 105 to generate the Turkish language model 170 that is adapted for the home assistant domain. The Turkish language model 105 may be a general Turkish language model that is not biased to any particular n-grams 165.

The language model adaptor 160 may adapt the Turkish language model 105 for the home assistant domain by increasing the weights of the n-grams of the Turkish transcription data 110. For example, the language model adaptor 160 may increase the weight for the n-gram "hava nasil" such that if a Turkish speaker says something that sounds similar to "hava nasil," the Turkish language model 170 may be more likely to select "hava nasil" as the transcription even if the general Turkish language model 105 would not.

The language model adaptor 160 may adapt the Turkish language model 170 to be more likely to recognize n-grams 175 such as "hava nasil?", "caz müzik çalmak," "sesi aç," "yaniyor," and other n-grams included in the Turkish transcriptions 110. In some implementations, the language model adaptor 160 may adapt the Turkish language model 170 according to the appearance frequency of n-grams in the Turkish transcriptions 110. For example, if "hava nasil?" appears more frequently in the Turkish transcriptions 110 than "sesi aç," then the language model adaptor 160 may bias the Turkish language model 170 more heavily towards "hava nasil" than "sesi aç." In some implementations, the language model adaptor 160 may bias the Turkish language model 170 towards the different terms of each n-gram 175. For example, the language model adaptor 160 may bias towards both "hava" and "nasil." In some instances the language model adaptor 160 may bias towards "hava nasil" more than "hava" and "nasil" individually.

The smart speaker 120 accesses the Turkish language model 170 during processing of the utterance 130. The smart speaker 120 may be operating in the home assistant domain, and, therefore, accesses the Turkish language model 170 adapted for the home assistant domain. As illustrated in FIG. 1, the smart speaker 120 may prompt the user 125 by outputting, "Merhaba, sana nasil yardim edebilirim?" The smart speaker 120 may prompt the user 125 in response to the user 125 touching the smart speaker 120, speaking a predetermined hotword, e.g., "ok computer" or a similar Turkish phrase, or any other similar action. The user 125 may responds with the utterance 130, "hava nasal?" In some implementations, the user 125 may speak a hotword followed by the utterance 130 without the smart speaker outputting prompt 180.

The smart speaker 120 receives the utterance 130 and performs automated speech recognition using a Turkish acoustic model and the Turkish language model 170 that is adapted for the home assistant domain. The smart speaker 120 initiates an action based on the utterance 130. In this case, the action may be generating a query for the weather in the location of the smart speaker 120. The smart speaker 120 may receive a response to the query and generate the response 135, "Güneşli, 20 derece."

Figure 2:
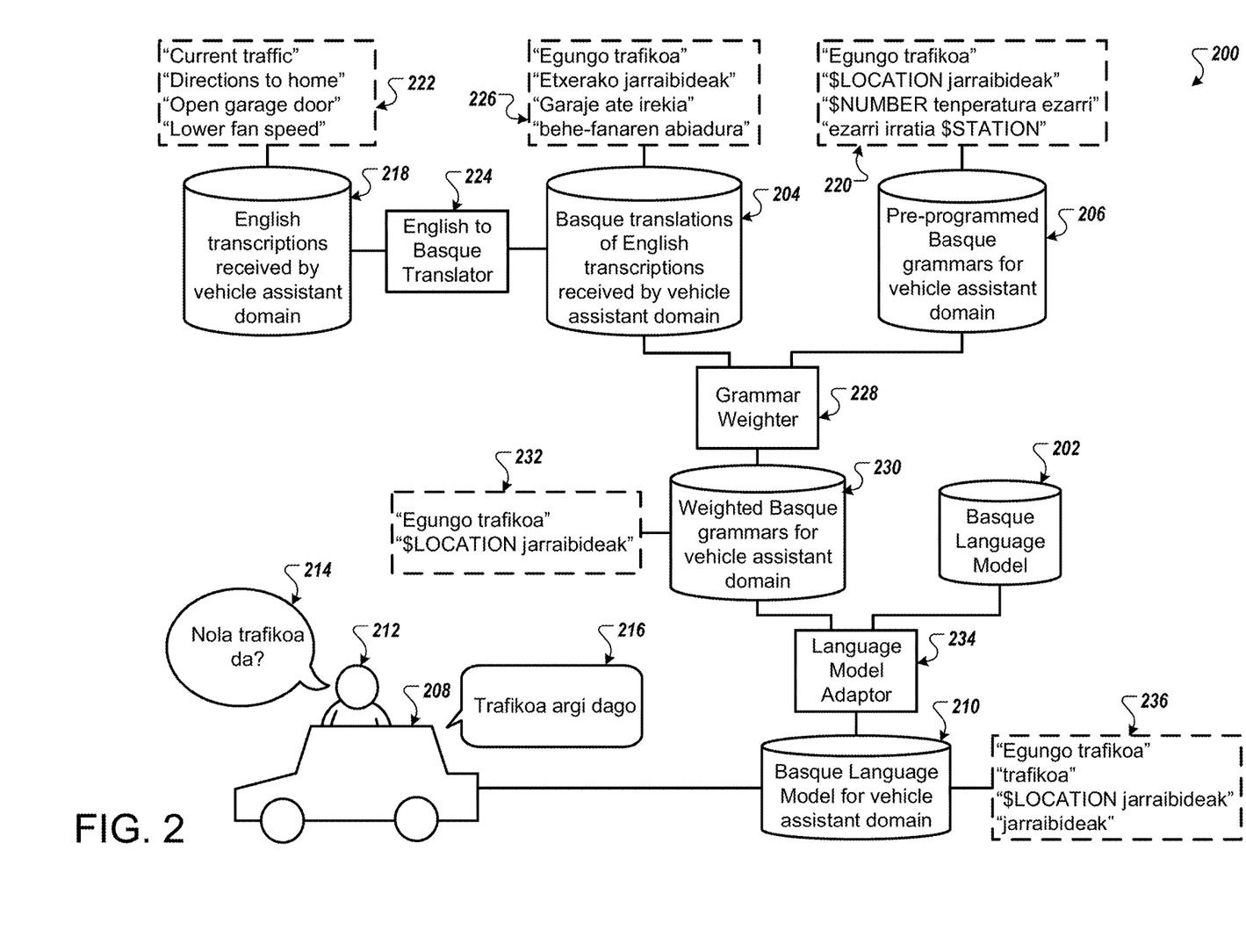
FIG. 2 illustrates an example system that biases a language model for use in a specific domain using both translated training data and pre-selected grammars.

FIG. 2 illustrates an example system 200 that biases a language model 202 for use in a specific domain using both translated training data 204 and pre-selected grammars 206. Briefly, and as described in more detail below, the system 200 compares pre-selected grammars 206 and translated training data 204 to identify common words and phrases that are likely to be used by speakers in a specific domain. The system 200 biases a language model to favor the terms in the grammars 206 and the translated training data.

A vehicle equipped with an automated digital assistant 208 may use the biased language model 210 during the automated speech recognition process. The user 212 speaks a query 214 to the automated digital assistant 208, and the automated digital assistant 208 uses the biased language model 210 to generate a transcription of the query 214. Based on the query 214, the automated digital assistant 208 may generate a response 216 to the query 214.

Similar to system 100 in FIG. 1, system 200 may be configured to generate a biased language model 210 for a language in which the system 200 does not have any access to training data in the language. In the example in FIG. 2, the system 200 generates a biased Basque language model 210 for the vehicle assistant domain despite only having access to English transcriptions 218 received by devices operating in the vehicle assistant domain.

In addition to utilizing the English transcriptions 218 received by devices operating in the vehicle assistant domain, the system 200 accesses pre-programmed grammars 206. In order to ensure that a speech recognition product for a new language may function properly, a developer may include a set of grammars 206 that the speech recognizer can access to assist in determining the action requested by the user. Instead of launching a speech recognition product in a new language with only a generic language model, the developer may include a set of grammars 206 to ensure that the user can interact with the device. The device may indicate the syntax of the grammars 206 and the action for each grammar by displaying the syntax on a display, outputting audio of examples, or any other similar way of outputting data.

A grammar may be different than the vocabulary that the language model selects words from. A grammar is related to the structure of a transcription of an utterance. If the transcription matches the structure of a grammar, then the system 200 performs the action that corresponds to that grammar. A grammar may be any structure of words that can be described using a common notation technique, for example, Bakus-Naur form. Each grammar may correspond to a specific user intent. For example, the user intent may be to issue a home automation command or a media playing command. One example of a grammar may include a grammar for an alarm. The alarm grammar may define a digit as 0, 1, 2, 3, 4, 5, 6, 7, 8, 9, or 0 using the notation $DIGIT=(0|1|2|3|4|5|6|7|8|9). The alarm grammar may define a time using the notation $TIME=$DIGIT $DIGIT: $DIGIT $DIGIT (am|pm) that indicates the time includes two digits, followed by a colon, followed by a two digits, and followed by "am" or "pm." The alarm grammar may define the mode of the alarm using the notation $MODE= (alarm|timer) that indicates whether the alarm should be in alarm mode or timer mode. Finally, the alarm grammar may define the alarm syntax as $ALARM=set $MODE for $TIME that indicates the user can say "set alarm for 6:00 am" or "set timer for 20:00." A speech recognition system uses the grammar to parse the transcription of the utterance or the typed command and identify an action for the device to perform.

In some instances, the grammars 206 may not indicate which of the grammars 206 or words included in the grammars 206 may be more something that a speaker is more likely to say to a device operating in a specific domain. For example, the grammars 206 may be a set of grammars for a vehicle assistant domain. In addition to the grammar examples 220 that include "egungo trafikoa," "$LOCATION jarraibideak," "$NUMBER tenperatura ezarri," and "ezarri irratia $STATION," the grammar examples 220 may also include the $ALARM grammar. However, in the vehicle assistant domain a speaker may be more likely to say commands for controlling the vehicle, requesting traffic information, requesting directions, and other vehicle related commands. While it may be important for the vehicle to be able to recognize and perform a command to set an alarm, an alarm command may not be as common in the vehicle assistant domain.

For the example illustrated in FIG. 2, a developer may wish to make the vehicle assistant technology available to Basque speakers. If the developer had access to transcriptions of Basque speakers using the vehicle assistant technology, then the developer would be able to use those transcriptions to adapt a Basque language model for the vehicle assistant domain. Without the transcriptions of Basque speakers using the vehicle assistant technology, the developer may user a general Basque language model 202. Using the general Basque language model 202 may provide an inferior experience for the speaker because the Basque language model 202 may not recognize the speaker saying, "egungo trafikoa" if the user does not speak clearly or there are other Basque phrases that sound similar to "egungo trafikoa." A Basque language model that is biased toward phrases that a speaker is more likely to say in the vehicle assistant domain may be more likely to recognize the speaker saying, "egungo trafikoa," in instances where the general Basque language model 202 may not. In the absence of transcriptions of Basque speakers using the vehicle assistant technology and a Basque language model adapted for the vehicle assistant domain, including the grammars 206 may be what a developer includes in the vehicle assistant technology when launching the technology for Basque speakers.

The system 200 illustrates the components for using the grammars 206 and English transcriptions 218 to adapt a Basque language model 202 and generate a Basque language model 210 adapted for the vehicle assistant domain. The system 200 accesses English transcription data 218 that was received by computing devices operating in the vehicle assistant domain. A device operating in the vehicle assistant domain may include devices such as a car equipped with a voice interaction system. Other devices may operate in the vehicle assistant domain, and transcriptions collected from those devices may be added to the English transcription data 218. As an example, the English transcription data 218 may include transcriptions 145 such as "current traffic," "directions to home," "open garage door," "lower fan speed," and transcriptions of other utterances received by devices operating in the vehicle assistant domain.

In some implementations, the system 200 may generate the English transcription data 218 by performing automated speech recognition on audio data of utterances received by devices operating in the vehicle assistant domain. In some implementations, the system 200 may receive the English transcription data 218 from manual transcribers who transcribed the audio data of utterances received by devices operating in the vehicle assistant domain. In some implementations, the English transcription data 218 may include a mix of both automated transcriptions and manual transcriptions.

The system 200 provides the English transcription data 218 as an input to an English to Basque translator 224. The English to Basque translator 224 may be a machine translator that automatically translates the English transcription data 218 to Basque transcription data 204. In some implementations, the English to Basque translator 224 may be a manual translator.

The Basque transcription data 204 may include transcriptions 226 such as, "egungo trafikoa", "etxerako jarraibideak," "garaje ate irekia," and "behe-fanaren abiadura," which may be Basque translations of current traffic," "directions to home," "open garage door," and "lower fan speed," respectively. The transcriptions 226 may include additional translated transcriptions of the English transcription data 218.

In some implementations, the English to Basque translator 224 may make errors in translating the English transcription data 140. In this case, the system 200 may translate additional English transcription data transcribed from other utterances received in a variety of domains and/or in a general domain. The system 200 may provide the general English transcription data as an input to the English to Basque translator 224. The system 200 may compare the Basque transcription data 204 to the general Basque transcription data to identify n-grams that may be more common in the home assistant domain. Using both domain specific translated transcriptions and general translated transcriptions may allow the system 200 to remove some of the errors that occur during translation. Because some errors may be likely to occur when translating both domain specific transcriptions and general transcriptions, those errors may cancel out and the system may not identify n-grams related to the errors as more likely to occur in a specific domain.

The system 200 provides the Basque transcription data 204 and the Basque grammars 206 as inputs to the grammar weighter 228. The grammar weighter 228 may be configured generate the weighted grammars 230 by comparing the Basque transcription data 204 to the Basque grammars 206. The grammar weighter 228 may identify the grammars included in the Basque grammars 206 that parse the words or phrases stored in the Basque transcription data 204. For example, the Basque grammar "$LOCATION jarraibideak" may parse the Basque transcription "Etxerako jarraibideak" because "etxerako" may be included as a term that can occupy the $LOCATION variable. The Basque grammar ezarri irratia $STATION" may not parse any of the transcriptions in the Basque transcription data 204. As illustrated with weighted grammars 232, the grammar weighter 228 may identify both "egungo trafikoa" and "$LOCATION jarraibideak" as grammars that are more to be spoken by Basque users interacting with a vehicle assistant system.

In some implementations, the grammar weighter 228 can assign numerical weights to the Basque grammars 206. For example, the grammar weighter 228 may assign a weight of 0.1 to grammars that do not parse any of the transcriptions in the Basque transcription data 204. A weight of 0.1 may not indicate that a vehicle assistant system may not identify that grammar as parsing a transcription, but it may decrease the likelihood of the vehicle assistant system selecting that grammar and performing the corresponding action when there are other grammars with higher weights that also parse the transcription. The grammar weighter 228 may assign a higher weight based on the frequency that a parseable transcriptions appears in the Basque transcription data 204. For example, if the Basque transcription data 204 includes seven transcriptions that are parsable by the grammar "ezarri irratia $STATION," then the grammar weighter 228 may assign a weight of 0.3. Some of the seven transcriptions may be identical and others may include a different term for the $STATION variable. If the if the Basque transcription data 204 includes eleven transcriptions that are parsable by the grammar "$NUMBER tenperatura ezarri," then the grammar weighter 228 may assign a weight of 0.4. In some implementations, the grammar weighter 228 may assign the same weight to grammars that parse at least one transcription and a different weight to grammars that parse no transcriptions.

The system 200 provides the weighted Basque grammars 230 and the Basque language model 202 as inputs to the language model adaptor 234. The language model adaptor 234 may be configured to bias the Basque language model 202 to generate the Basque language model 210 that is adapted for the vehicle assistant domain. The Basque language model 202 may be a general Basque language model that is not biased to any particular terms, phrases, words, or n-grams.

The language model adaptor 234 may adapt the Basque language model 202 for the vehicle assistant domain by increasing the weights of the n-grams of the weighted Basque grammars 230. For example, the language model adaptor 234 may increase the weight for the n-gram "egungo trafikoa" such that if a Basque speaker says something that sounds similar to "egungo trafikoa," the Basque language model 210 may be more likely to select "egungo trafikoa" as the transcription even if the general Basque language model 202 would not.

The language model adaptor 234 may adapt the Basque language model 210 to be more likely to recognize n-grams 232 such as "egungo trafikoa", "$LOCATION jarraibideak," and other n-grams included in the weighted Basque grammars 230. In some implementations, the language model adaptor 234 may adapt the Basque language model 210 according to weight assigned to each of the grammars. For example, if "egungo trafikoa" has a weight of 0.3 and "$LOCATION jarraibideak" has a weight of 0.5, then the language model adaptor 234 may bias the Basque language model 210 such that the Basque language model 210 may be more likely to select "etxerako jarraibideak" over a similar sounding transcription upon receipt of an utterance. The Basque language model 210 may still be more likely to select "egungo trafikoa" over a similar sounding transcription upon receipt of an utterance, but the Basque language model 210 biasing may be less than "etxerako jarraibideak." In some implementations, the language model adaptor 234 may bias the Basque language model 210 towards the different terms of each weighted grammar 230. For example, the language model adaptor 234 may bias towards "egungo trafikoa" "trafikoa," and "egungo." In some instances the language model adaptor 234 may bias towards "egungo trafikoa" more than "trafikoa" and "egungo" individually. In some implementations, the language model adaptor 234 may identify "trafikoa" as an n-gram to bias towards more heavily than "egungo" because "trafikoa" may appear in more heavily weighted grammars included in the weighted grammars 230.

In some implementations, the language model adaptor 234 may bias the Basque language model 210 towards n-grams that are parsable by the weighted grammars 230 in addition to each term that may be available for a variable in the grammar. For example, the language model adaptor 234 may bias the Basque language model 210 towards the terms that may occupy the $LOCATION variable in addition to "$LOCATION jarraibideak," and "jarraibideak."

The vehicle 208 may be equipped with a vehicle assistant system. The vehicle assistant system may access the Basque language model 210 during processing of the utterance 214. The vehicle assistant system, by virtue of being a digital assistant system located in a vehicle, is operating in the vehicle assistant domain. The As illustrated in FIG. 2, the vehicle assistant system may listen for voice commands from the user 212. The vehicle assistant system may begin processing received audio in response to the user 212 speaking a predetermined hotword, e.g., "ok computer" or a similar Basque phrase, the user 212 pressing a button on the steering wheel, or any other similar action. The user may speak utterance 214, "Nola trafikoa da?"

The vehicle assistant system receives the utterance 214 and performs automated speech recognition using a Basque acoustic model and the Basque language model 210 that is adapted for the vehicle assistant domain. The vehicle assistant system initiates an action based on the utterance 214. In this case, the action may be generating a query for the traffic for the location of the vehicle 208. The vehicle assistant system may receive a response to the query and generate the response 216, "Trafikoa argi dago." The Basque language model 210 may not be biased towards the exact phrase of the utterance 214, but the Basque language model 210 may be biased towards the keyword "trafikoa." Biasing towards an n-gram that the user speaks may assist the vehicle assistant system in identifying an accurate transcription.

Figure 3:
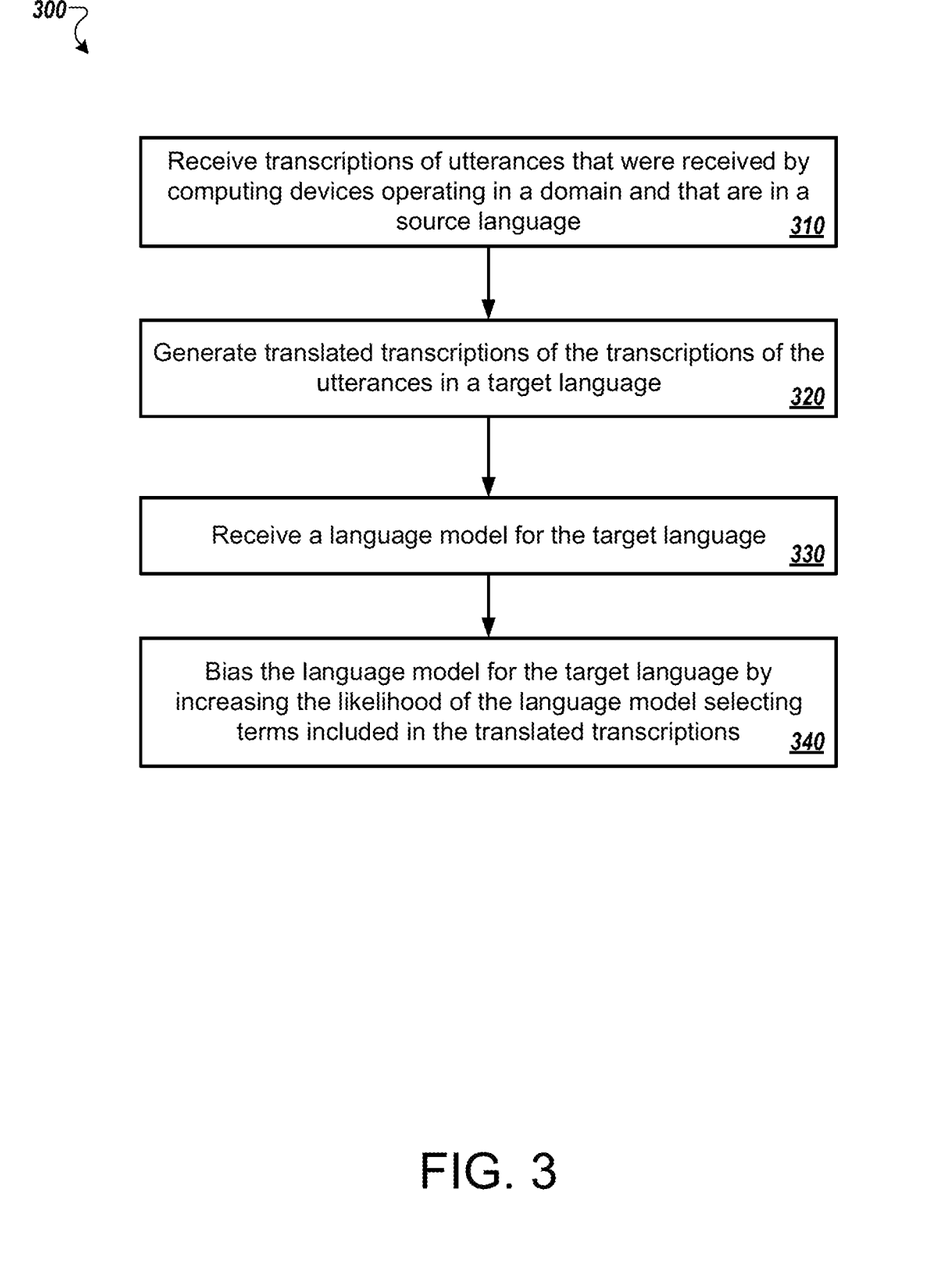
FIG. 3 is a flowchart of an example process for adapting a language model for use in a specific domain.

FIG. 3 is a flowchart of an example process 300 for adapting a language model for use in a specific domain. In general, the process 300 uses translated training data to adapt a language model for use in a particular domain. The process 300 may be useful if no training data for the target language exists in that particular domain. The process 300 will be described as being performed by a computer system comprising one or more computers, for example, the system 100 of FIG. 1 or system 200 of FIG. 2. Each of the components of either system 100 or system 100 may be included on a single computing device or distributed across multiple computing devices.

The system receives transcriptions of utterances that were received by other systems operating in a domain and that are in a source language (310). In some implementations, the system may receive audio data of source language utterances that were received by other systems while the other systems operated in the domain. In this instance, the system may generate the transcriptions of the audio data using an automated speech recognizer configured to recognize the source language. The domain may be related to the type of system receiving the utterances such as a smart speaker with a display. Other domains may include a smart speaker without a display, a vehicle assistant domain, a maps application domain, a domain dependent on location (e.g., a park or a restaurant), a home assistant domain, and any other similar type of domain.

The system generates translated transcriptions of the transcriptions of the utterances in a target language (320). The system may use machine translations to translate the transcriptions. For example, the system may use a machine translator that is configured to translate English to Turkish. In some implementations, the system may receive and translate transcriptions received by system operating in different domains. For example, the system may translate transcriptions received in the maps application domain. The system may also translate transcriptions received in other domains that may include multiple domains such as a general domain or a combination of other domains that may or may not include the maps application domain.

The system receives a language model for the target language (330). In some implementations the target language model is a general purpose language model that may not be biased towards any particular words, phrases, and/or n-grams. For example, the target language model may be a general purpose Turkish language model.

The system biases the language model for the target language by increasing the likelihood of the language model selecting terms included in the translated transcriptions (340). The system identifies the words, phrases, and or n-grams that appear in the translated transcriptions. The system biases the target language model such that the biased language model may be more likely to generate a transcription that includes the words, phrases, and/or n-grams that appear in the translated transcriptions in instances where the user's speech sounds similar to other words, phrases, and/or n-grams.

In some implementations, the system may compare the translated transcriptions from a specific domain to translated transcriptions from other domains. The system may identify those words, phrases, and/or n-grams that are more common in the translated transcriptions from the specific domain. The system may bias the language model to be more likely to generate transcriptions that include these words, phrases, and/or n-grams. By using the additional translations from the other domains may allow the system to remove noise from the translation process. Because the translation process may be a machine translation process, the translation process may have some inaccuracies. These inaccuracies may be just as likely to appear in the translated transcriptions from the specific domain as in the translated transcriptions from other domains. By comparing the two groups of translated transcriptions, the system may be able to cancel out words that may not reflect accurate translations and bias the language model to be more likely to generate transcriptions that include words, phrases, and/or n-grams from the translated transcriptions from a specific domain without any words, phrases, and/or n-grams from translation noise. Translating the transcriptions from other domains may also help the system identify words, phrases, and/or n-grams that may be closely related to the specific domain instead of words, phrases, and/or n-grams that may be common words in general.

In some implementations, the system may bias the language model based on the frequency that words, phrases, and/or n-grams appear in the translated transcriptions. For example, if the Turkish word "hava," which is related to the English word "weather," appears more frequently in the translated transcriptions than the Turkish word "caz," which is related to the English word "jazz," then the system may bias the language model more heavily towards "hava" than "caz." In some implementations, the system may bias the language model equally for words, phrases, and/or n-grams that appear in the translated transcriptions.

In some implementations, the system may access a set of grammars in the target language that a device operating in the specific domain may use to parse candidate transcriptions. The system may compare the n-grams included in the grammars to the n-grams in the translated transcriptions. The system may weight the grammars based on the frequency that an n-gram, that appears in the grammars or is parsable by the grammars, appears in the translated transcriptions. The system may use the weighted grammars to adapt a language model by biasing the language model to be more likely to select n-grams in both the grammars and the translated transcriptions when generating transcriptions.

In some implementations, the system, or another system, may use the adapted language model during an automated speech recognition process when the system or the other system is operating in the domain for which the system adapted the language model. The system or the other system may use an acoustic model trained to identify phonemes for the target language and the adapted language model. If the system or the other system has access to a set of grammars, then the system may use the grammars to parse the candidate transcriptions.

Figure 4:
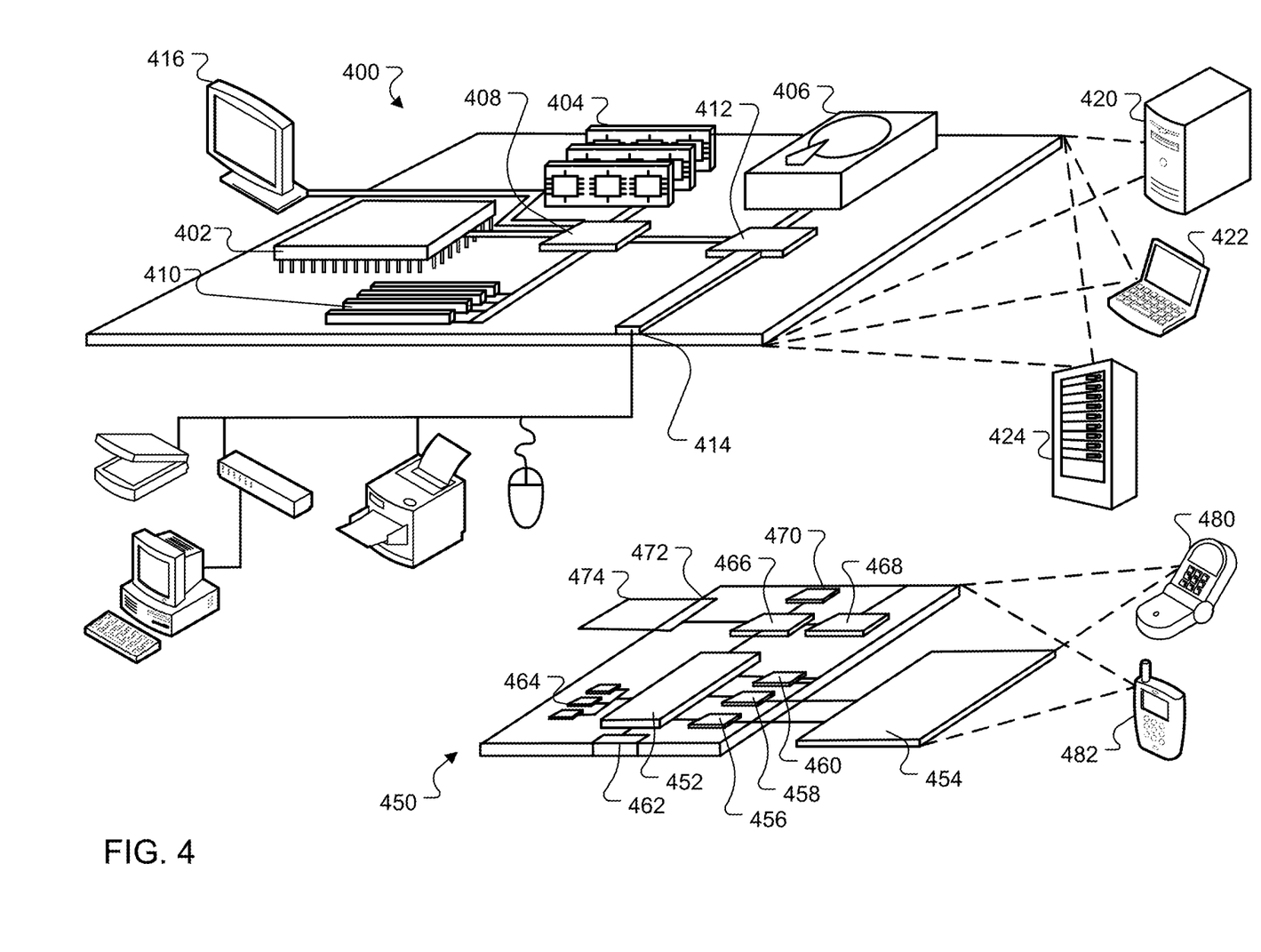
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device, transcriptions of utterances that were received by computing devices operating in a domain and that are in a source language;
generating, by the computing device, translated transcriptions of the transcriptions of the utterances in a target language;
receiving, by the computing device, a language model for the target language;
biasing, by the computing device, the language model for the target language by increasing the likelihood of the language model selecting terms included in the translated transcriptions; and
generating, by the computing device while operating in the domain, a transcription of an utterance in the target language using the biased language model.

2. The method of claim 1, wherein generating a transcription of an utterance in the target language using the biased language model comprises:
while the computing device is operating in the domain, receiving, by the computing device, audio data of the utterance;
providing, by the computing device, the audio data as an input to an acoustic model that is configured to identify phonemes of the utterance;
based on the computing device operating in the domain, providing, by the computing device, the phonemes of the utterance as an input to the biased language model; and
based on providing the phonemes of the utterance as the input to the biased language model, generating, by the computing device, a transcription of the utterance.

3. The method of claim 1, wherein:
the language model for the target language is a general language model, and
the biased language for the target language is a language model specific for computing devices operating in the domain.

4. The method of claim 1, comprising:
identifying, by the computing device, n-grams that appear in the translated transcription and an appearance frequency of each n-gram; and
identifying, by the computing device, a subset of the n-grams that appear in the translated transcriptions more than a threshold appearance frequency,
wherein the computing device biases the language model by increasing the likelihood of the language model selecting the subset of n-grams.

5. The method of claim 4, wherein increasing the likelihood of the language model selecting the subset of n-grams comprises:
increasing, for each n-gram in the subset of n-grams, the likelihood by a larger amount based on a larger difference between the appearance frequency for the n-gram and the threshold appearance frequency.

6. The method of claim 1, comprising:
receiving, by the computing device, audio data of the utterances that were received by the computing device operating in the domain and that are in the source language,
wherein receiving the transcriptions of the utterances that were received by the computing devices operating in the domain and that are in the source language comprises:
generating, by the computing device, the transcriptions of the utterances that were received by computing devices operating in a domain and that are in a source language.

7. The method of claim 1, comprising:
receiving, by the computing device, additional transcriptions of additional utterances that were received by the computing devices operating in domains other than the domain and that are in the source language;
generating, by the computing device, additional translated transcriptions of the additional transcriptions;
identifying terms that have a higher appearance frequency in the translated transcriptions than in the additional translated transcriptions,
wherein biasing the language model for the target language by increasing the likelihood of the language model selecting terms included in the translated transcriptions comprises:
biasing the language model for the target language by increasing the likelihood of the language model selecting terms that have a higher appearance frequency in the translated transcriptions than in the additional translated transcriptions.

8. The method of claim 1, comprising:
receiving, by the computing device, grammars in the target language,
wherein biasing the language model for the target language by increasing the likelihood of the language model selecting terms included in the translated transcriptions comprises:
biasing the language model for the target language by increasing the likelihood of the language model selecting grammars that include the terms included in the translated transcriptions.

9. A system comprising:
one or more computers; and
one or more storage devices storing instructions that are operable, when executed by the one or more computers, to cause the one or more computers to perform operations comprising:
receiving, by a computing device, transcriptions of utterances that were received by computing devices operating in a domain and that are in a source language;
generating, by the computing device, translated transcriptions of the transcriptions of the utterances in a target language;
receiving, by the computing device, a language model for the target language;
biasing, by the computing device, the language model for the target language by increasing the likelihood of the language model selecting terms included in the translated transcriptions; and
generating, by the computing device while operating in the domain, a transcription of an utterance in the target language using the biased language model.

10. The system of claim 9, wherein generating a transcription of an utterance in the target language using the biased language model comprises:

while the computing device is operating in the domain, receiving, by the computing device, audio data of the utterance;

providing, by the computing device, the audio data as an input to an acoustic model that is configured to identify phonemes of the utterance;

based on the computing device operating in the domain, providing, by the computing device, the phonemes of the utterance as an input to the biased language model; and based on providing the phonemes of the utterance as the input to the biased language model, generating, by the computing device, a transcription of the utterance.

11. The system of claim 9, wherein:

the language model for the target language is a general language model, and the biased language for the target language is a language model specific for computing devices operating in the domain.

12. The system of claim 9, wherein the operations comprise:

identifying, by the computing device, n-grams that appear in the translated transcription and an appearance frequency of each n-gram; and identifying, by the computing device, a subset of the n-grams that appear in the translated transcriptions more than a threshold appearance frequency, wherein the computing device biases the language model by increasing the likelihood of the language model selecting the subset of n-grams.

13. The system of claim 12, wherein increasing the likelihood of the language model selecting the subset of n-grams comprises:

increasing, for each n-gram in the subset of n-grams, the likelihood by a larger amount based on a larger difference between the appearance frequency for the n-gram and the threshold appearance frequency.

14. The system of claim 9, wherein the operations comprise:

receiving, by the computing device, audio data of the utterances that were received by the computing device operating in the domain and that are in the source language, wherein receiving the transcriptions of the utterances that were received by the computing devices operating in the domain and that are in the source language comprises:

generating, by the computing device, the transcriptions of the utterances that were received by computing devices operating in a domain and that are in a source language.

15. The system of claim 9, wherein the operations comprise:

receiving, by the computing device, additional transcriptions of additional utterances that were received by the computing devices operating in domains other than the domain and that are in the source language;

generating, by the computing device, additional translated transcriptions of the additional transcriptions;

identifying terms that have a higher appearance frequency in the translated transcriptions than in the additional translated transcriptions, wherein biasing the language model for the target language by increasing the likelihood of the language model selecting terms included in the translated transcriptions comprises:

biasing the language model for the target language by increasing the likelihood of the language model selecting terms that have a higher appearance frequency in the translated transcriptions than in the additional translated transcriptions.

16. The system of claim 9, wherein the operations comprise:

receiving, by the computing device, grammars in the target language, wherein biasing the language model for the target language by increasing the likelihood of the language model selecting terms included in the translated transcriptions comprises:

biasing the language model for the target language by increasing the likelihood of the language model selecting grammars that include the terms included in the translated transcriptions.

17. A non-transitory computer-readable medium storing software comprising instructions executable by one or more computers which, upon such execution, cause the one or more computers to perform operations comprising:

receiving, by a computing device, transcriptions of utterances that were received by computing devices operating in a domain and that are in a source language;

generating, by the computing device, translated transcriptions of the transcriptions of the utterances in a target language;

receiving, by the computing device, a language model for the target language;

biasing, by the computing device, the language model for the target language by increasing the likelihood of the language model selecting terms included in the translated transcriptions; and generating, by the computing device while operating in the domain, a transcription of an utterance in the target language using the biased language model.

18. The medium of claim 17, wherein generating a transcription of an utterance in the target language using the biased language model comprises:

while the computing device is operating in the domain, receiving, by the computing device, audio data of the utterance;

providing, by the computing device, the audio data as an input to an acoustic model that is configured to identify phonemes of the utterance;

based on the computing device operating in the domain, providing, by the computing device, the phonemes of the utterance as an input to the biased language model; and based on providing the phonemes of the utterance as the input to the biased language model, generating, by the computing device, a transcription of the utterance.

19. The medium of claim 17, wherein the operations comprise:

identifying, by the computing device, n-grams that appear in the translated transcription and an appearance frequency of each n-gram; and identifying, by the computing device, a subset of the n-grams that appear in the translated transcriptions more than a threshold appearance frequency, wherein the computing device biases the language model by increasing the likelihood of the language model selecting the subset of n-grams.

20. The medium of claim 17, wherein the operations comprise:
   receiving, by the computing device, audio data of the utterances that were received by the computing device operating in the domain and that are in the source language,
   wherein receiving the transcriptions of the utterances that were received by the computing devices operating in the domain and that are in the source language comprises:
      generating, by the computing device, the transcriptions of the utterances that were received by computing devices operating in a domain and that are in a source language.

\* \* \* \* \*